United States Patent
Poling et al.

(10) Patent No.: US 10,163,533 B2
(45) Date of Patent: Dec. 25, 2018

(54) CONTROL ROD DRIVE MECHANISM OUTER DIAMETER SEAL ULTRA HIGH PRESSURE CAVITATION PEENING

(71) Applicant: AREVA Inc., Lynchburg, VA (US)

(72) Inventors: Gary R. Poling, Forest, VA (US); Doug M. Lawrence, Rustburg, VA (US); Bradley H. Graham, Lynchburg, VA (US); David J. Peckham, Madison Heights, VA (US)

(73) Assignee: Framatome Inc., Lynchburg, VA (US)

( * ) Notice: Subject to any disclaimer, the term of this patent is extended or adjusted under 35 U.S.C. 154(b) by 502 days.

(21) Appl. No.: 14/554,525

(22) Filed: Nov. 26, 2014

(65) Prior Publication Data

US 2016/0358681 A1     Dec. 8, 2016

(51) Int. Cl.
| | |
|---|---|
| C21D 7/06 | (2006.01) |
| G21C 19/00 | (2006.01) |
| C21D 10/00 | (2006.01) |

(52) U.S. Cl.
CPC .............. *G21C 19/00* (2013.01); *C21D 7/06* (2013.01); *C21D 10/00* (2013.01); *G21Y 2002/103* (2013.01)

(58) Field of Classification Search
CPC ........... B21D 31/06; C21D 7/06; C21D 10/00
See application file for complete search history.

(56) References Cited

U.S. PATENT DOCUMENTS

| | | | |
|---|---|---|---|
| 5,307,661 A | 5/1994 | Fink et al. | |
| 6,855,208 B1 | 2/2005 | Soyama | |
| 6,993,948 B2 | 2/2006 | Offer | |
| 8,331,522 B2 | 12/2012 | Ono et al. | |
| 2013/0074561 A1 | 3/2013 | Alberts et al. | |
| 2013/0174627 A1 | 7/2013 | Aoki et al. | |
| 2013/0233040 A1 | 9/2013 | Butler et al. | |

FOREIGN PATENT DOCUMENTS

| | | |
|---|---|---|
| EP | 1 170387 A1 | 1/2002 |
| JP | H09 136261 A | 5/1997 |
| JP | 2006346775 A | 12/2006 |
| WO | WO 2015/146232 A1 | 10/2015 |

OTHER PUBLICATIONS

Machine translation of JP 2006-346775A, Mori et al., translated on Apr. 17, 2018, pp. 1-11.*
International search Report, PCT/US2015/061514.

* cited by examiner

*Primary Examiner* — Teresa M Ekiert
(74) *Attorney, Agent, or Firm* — Davidson, Davidson & Kappel, LLC

(57) ABSTRACT

A sealing device is provided to form a sealed region about one or more surfaces to be treated. The sealing device has an open end with a rim configured to matingly engage a treatment surface. The sealing device is braced both vertically and laterally, and the sealed region is flooded and pressurized. A peening nozzle and manipulating tooling are positioned within an interior volume of the sealing device. Pressurized fluid is ejected from the nozzle causing the formation of cavitation bubbles. The nozzle flow causes the cavitation bubbles to settle on the surfaces to be treated. The collapsing impact of the cavitation bubbles imparts compressive stress in the materials of the treatment surfaces.

20 Claims, 6 Drawing Sheets

CONTROL ROD DRIVE MECHANISM OUTER DIAMETER SEAL ULTRA HIGH PRESSURE CAVITATION PEENING

BACKGROUND OF THE INVENTION

1. Field of the Invention

The present invention relates to apparatus and method for performing cavitation peening, and, more particularly, the present invention relates to sealing a cavitation zone in which to perform cavitation peening.

2. Description of the Related Art

Peening is a process of introducing mechanical stress into the surface layer of a part to compress and strengthen it against future fractures and wear. Peening can be performed in a variety of manners, including shot peening, laser peening and cavitation peening. Cavitation peening involves the application of bubbles onto the surface with the part in a liquid environment. The collapsing of the bubbles imparts impactive forces to the part. One difficulty with prior cavitation peening apparatus and methods is that the entire part to be treated is placed in the liquid environment. This can be difficult to achieve, especially when the part to be treated is itself large or is a part of a large apparatus or system.

While the present invention may be used in a variety of industries, the environment of a nuclear power plant will be discussed herein for illustrative purposes. A nuclear power plant has a nuclear reactor housed within a pressure vessel and a reactor coolant system (RCS) for removing heat from the reactor and to generate power. Nozzles are attached to the vessels and/or piping for a number of purposes, such as for connecting piping and instrumentation, providing vents, and securing control element drive mechanisms and heater elements.

The nuclear industry is required to perform inspections of such nozzles, as well as their welds, due to the emergence of primary water stress corrosion cracking (PWSCC). Stress corrosion cracking occurs in a material due to a combination of a corrosive environment and tensile forces placed on the material. Cracking can be induced in materials in different ways including cold forming, welding, grinding, machining, and heat treatment as well as other physical stresses placed on the material. Stress corrosion cracking in nuclear reactor environments is a significant phenomenon that must be carefully monitored for successful operation of a nuclear power plant facility. Without careful monitoring for PWSCC, material defects may begin and may ultimately damage the material. If cracking continues, the materials may be damaged to such an extent that the materials must be removed from service and replaced. In the nuclear reactor environment, such replacement of components is extremely undesirable due to radiological concerns related to worker and facility safety, as well as overall plant economic concerns.

Thus, what is needed is an apparatus and method of mitigating or preventing the initiation of stress corrosion cracking.

SUMMARY OF THE INVENTION

A sealing device is provided to form a sealed region about one or more surfaces to be treated, such as a nozzle extending through a nuclear reactor pressure vessel head, the head itself, and the weld(s) coupling the nozzle and head. The sealing device has an open end with a rim configured to matingly engage the surface of the head about the nozzle to be treated. The sealing device is braced both vertically and laterally, and the sealed region is flooded and pressurized.

A peening nozzle and manipulating tooling are positioned within an interior volume defined by the sealing device such that they are within the sealed region. Once the flooded region is pressurized, pressurized fluid is ejected from the nozzle causing the formation of cavitation bubbles. The nozzle flow causes the cavitation bubbles to settle on the surfaces to be treated. The collapsing impact of the cavitation bubbles imparts compressive stress in the materials of the treatment surfaces.

DESCRIPTION OF THE DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION OF THE INVENTION

Figure 1:
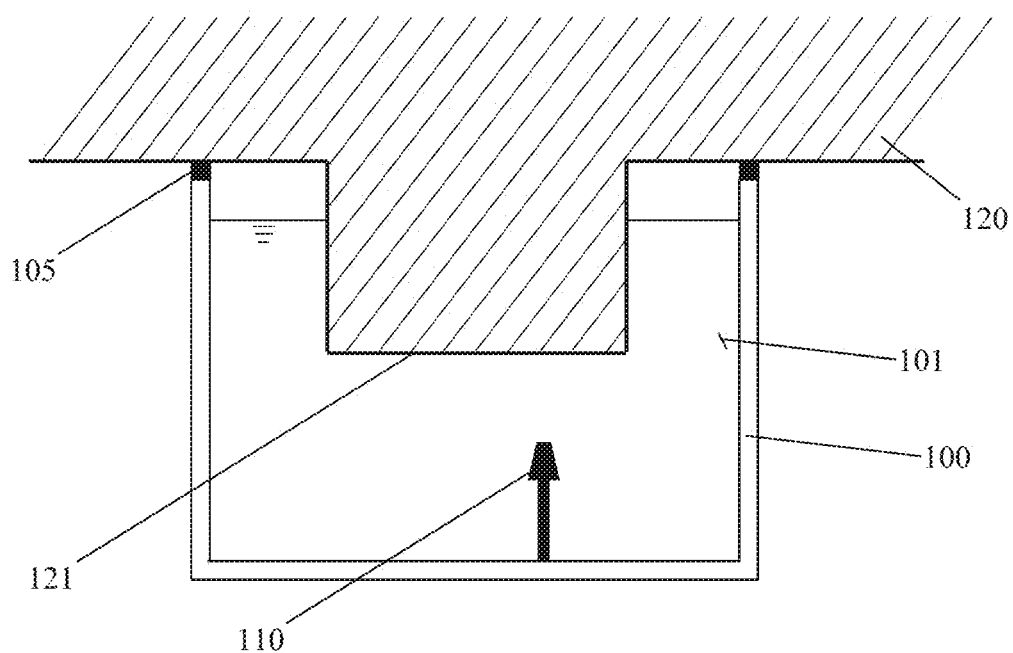
FIG. 1 shows a typical arrangement for the present invention.

The instant invention is an apparatus and method for cavitation peening a region of a part, such as a metal part. FIG. 1 shows a typical arrangement for the present invention. The apparatus includes a container 100 with a closed end to define an interior volume 101. The container 100 is configured to envelope a region 121 of a part 120 to be treated. A seal 105 is provided at an open end of the container 100. The container 100 is positioned such that the seal 105 surrounds the region 121. The seal 105 creates a barrier against the part 120 surrounding the region 121. The volume 101 is configured to be filled with a fluid at a predetermined pressure.

A nozzle 110 is positioned within the container 110. Pressurized liquid, such as water, is ejected from the nozzle 110, causing cavitation bubbles to form. The nozzle flow is directed at the region 121, causing the cavitation bubbles to settle thereon. The collapsing impact of the cavitation bubbles imparts compressive stress in the materials of the treatment surface 121. The nozzle 110 is moved around within the container 100 to treat all desired surfaces 121. Thus, cavitation peening is performed on the region 121 without the entire part 120 being submerged.

A primary target application for the instant invention is the mitigation of the outer diameter (OD) surfaces of pressurized water reactor (PWR) reactor vessel closure head (RVCH) control rod drive housing (CRDH) nozzles and attachment J-groove welds. Residual tensile stresses in nozzle material, weld material, and base metal cladding contribute to and exacerbate PWSCC. Changing the stress state from tensile to compressive can prevent PWSCC initiation, mitigating the need for costly and time consuming repairs. Peening provides asset life extension through elimination of the degradation process by imparting residual compressive stress to an object.

Figure 2:
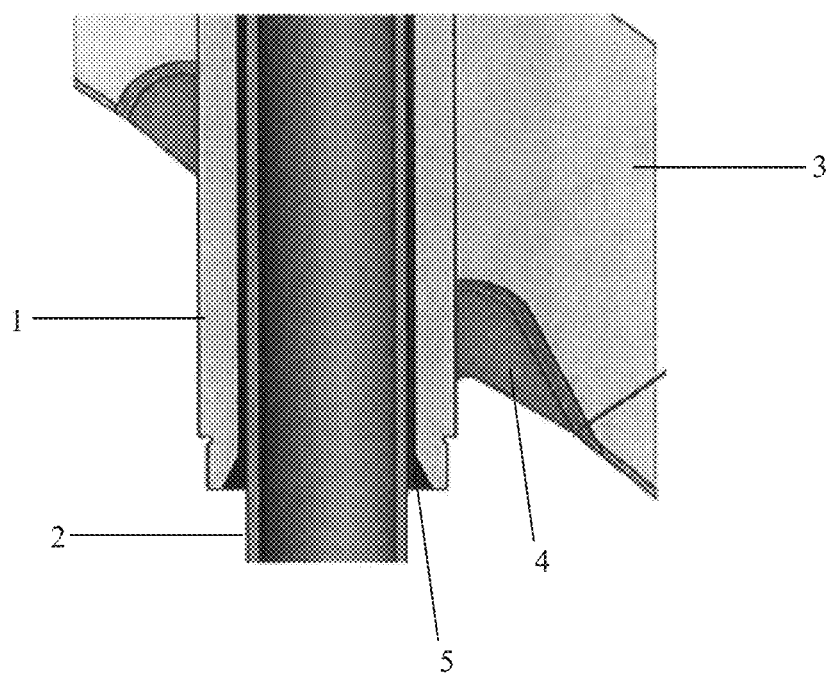
FIG. 2 shows a cross-sectional view of a typical arrangement for a control rod drive nozzle with a thermal sleeve in a reactor pressure vessel head.

FIG. 2 shows a cross-sectional view of a typical arrangement for a CRDH nozzle 1 with a thermal sleeve 2 in a reactor pressure vessel head 3. The CRDH nozzles 1 are secured to the head 3 via welds 4 called J-groove welds. During plant maintenance the head 3 and the components attached thereto are placed on a head stand and are not submerged in water. Access to an individual CRDH nozzle 1 is restricted under the reactor vessel head 3 by adjacent CRDH nozzles 1. CRDH nozzles 1 typically also have a thermal sleeve 2 extending down through the center of the nozzle 1, which hinders access to the area as well. Due to the limited access and lack of water, performing cavitation peening on these components and welds is not currently possible.

Figure 3:
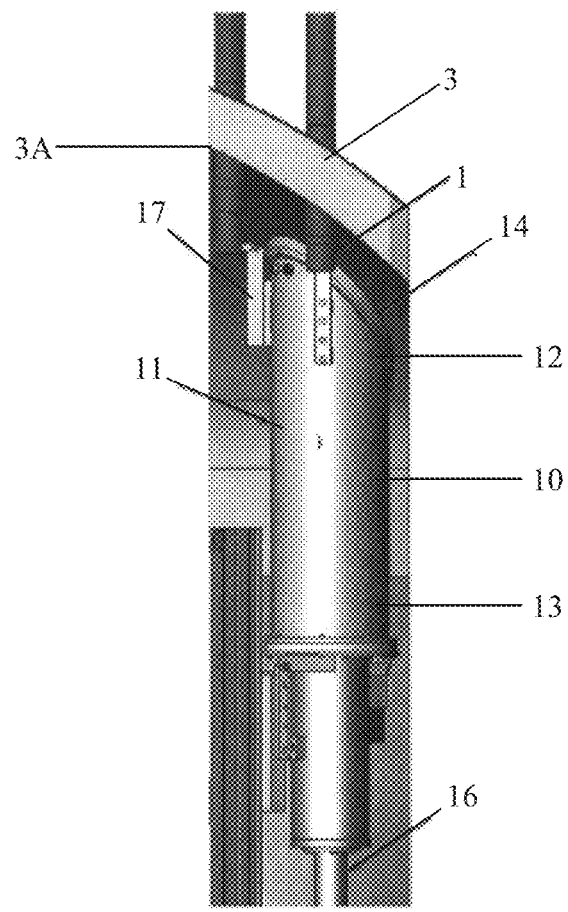
FIG. 3 shows a seal assembly of the present invention in place about a control rod drive nozzle passing through a reactor pressure vessel head.

The instant invention creates a sealed chamber around the CRDH nozzle 1 OD surfaces so that a flooded environment can be created. FIG. 3 shows a typical arrangement for a seal assembly 10 installed onto a specific CRDH nozzle 1. The assembly 10 seals on the ID of the reactor vessel head surface and has different fixture configurations to accommodate different slopes of the head at specific CRDH nozzle 1 locations. Once sealed, the created chamber is flooded and pressurized to the desired back pressure (1 to 100 psi or greater, depending on the specific application). Two brackets react off of adjacent CRDH nozzles to counter the horizontal loads created by the sealing device. A kickstand is extended to the floor and used to react the vertical sealing loads.

Inside the chamber is a customized ultra-high pressure (UHP) cavitation peening tool, designed to fit around thermal sleeves, yet having the reach to peen the CRDH nozzle and J-groove weld OD surfaces. The chamber itself can be manually installed or delivered remotely via a robotic manipulator. The vertical kickstand can be manually or remotely actuated.

The UHP cavitation peening process includes directing a nozzle at the work surface through which water at high pressure and high velocity is discharged through a small orifice. Vapor bubbles are formed in the resulting high velocity water jet stream as it contacts the water at comparatively lower pressure. The pressure within each bubble is below the vapor pressure of the surrounding water medium. The bubbles collapse at the surface, generating high pressure shock waves on the work surface that impart compressive stresses to the surface. Typically, the process requires a back pressure to prevent the bubbles from prematurely collapsing.

The UHP cavitation peening process initiates and the peening nozzle (peening head) is driven to rotate by tooling around the axis of the CRDH nozzle 1 so that the entire OD surface of the CRDH nozzle 1 and J-groove weld 4 can be peened. As the peening head rotates, the peening nozzle also actuates vertically up and down as needed for the optimal process effectiveness. In this manner, the UHP cavitation peening process is implemented without having the entire component submerged in water.

Figure 4:
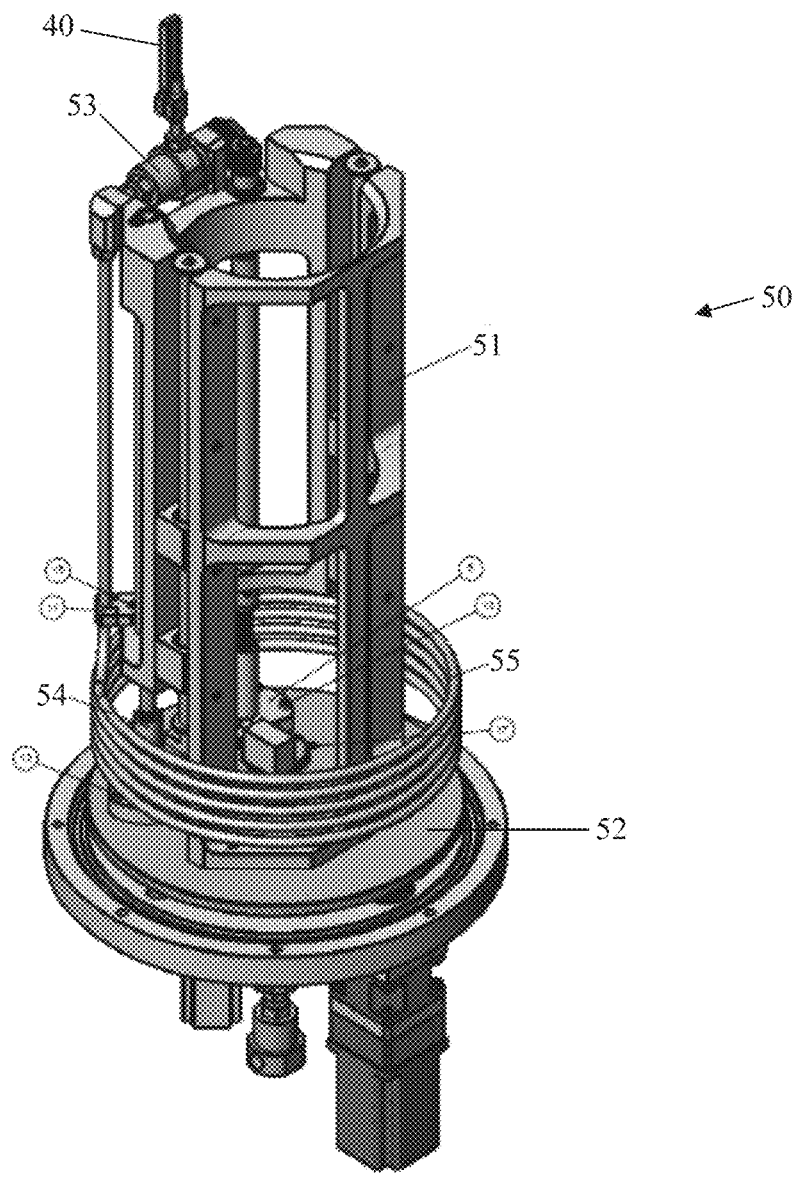
FIG. 4 shows a tooling assembly for moving a peening nozzle of the present invention.

FIG. 4 shows a preferred embodiment of the nozzle 40 and tooling 50 to manipulate the nozzle 40. The tooling 50 includes a body 51 defining an enclosed area. A base plate 52 is rotationally coupled to the body 51, allowing for rotation of the body 51. A ring bearing is used to maintain the water-tight integrity of the base plate to body junction. The nozzle 40 is coupled to the tooling 50 by a carriage 53, which is also connected to a lead screw 54, allowing for vertical movement of the nozzle 40. Additional drives allow for rotation and tilting of the carriage assembly 53 and nozzle 40.

Preferably, the peening nozzle water pressure is approximately 50 ksi to 60 ksi with a back pressure of approximately 30 psi to 50 psi. These operational parameters allow for preferred cavitation bubble size, as well as a preferred amount of shock pressure being imparted to the treatment surface upon collapse of the cavitation bubbles.

Figure 5:
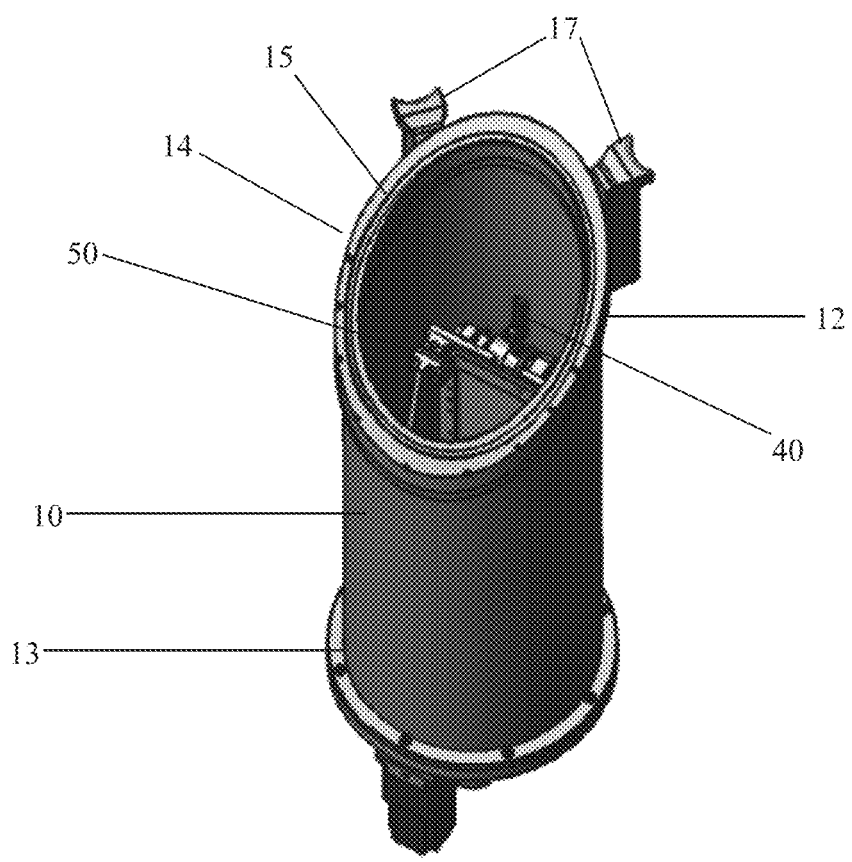
FIG. 5 shows the tooling and peening nozzle of FIG. 4 contained within the seal assembly of FIG. 3.

Cavitation peening requires that the nozzle and surface to be treated are in a liquid environment. Rather than placing the entire reactor pressure vessel head underwater, which would require substantial time and effort, as well as the creation of a large amount of waste water that must be disposed of, a seal assembly is used. FIG. 3 shows a preferred seal assembly 10. The seal assembly 10 includes a housing 11 that is configured to surround and enclose the tooling 50 and peening nozzle 40. FIG. 5 shows the tooling 50 and nozzle 40 contained within the seal assembly 10. The seal assembly body 11 includes an open proximal end 12 and a closed distal end 13. The proximal end 12 contains a rim 14 that is contoured spherically to matingly engage the curved inner surface 3A of the reactor pressure vessel head 3. A gasket or seal 15 is provided in the rim 14 to ensure water tight integrity of the seal assembly 10. A kickstand 16 can be coupled to an outer surface of the distal end 13 to provide vertical support to the seal assembly 10, tooling 50, and nozzle 40. The seal assembly 10 may also include one or more arms 17 to provide lateral support. Stainless steel, such as 18-8 stainless steel, is a preferred material for the tooling 50 and seal assembly 10. Stainless steel, such as 17-4 PPH stainless steel, is a preferred material for the nozzle 40. Silicone is a preferred material for the gasket 15.

Figure 6:
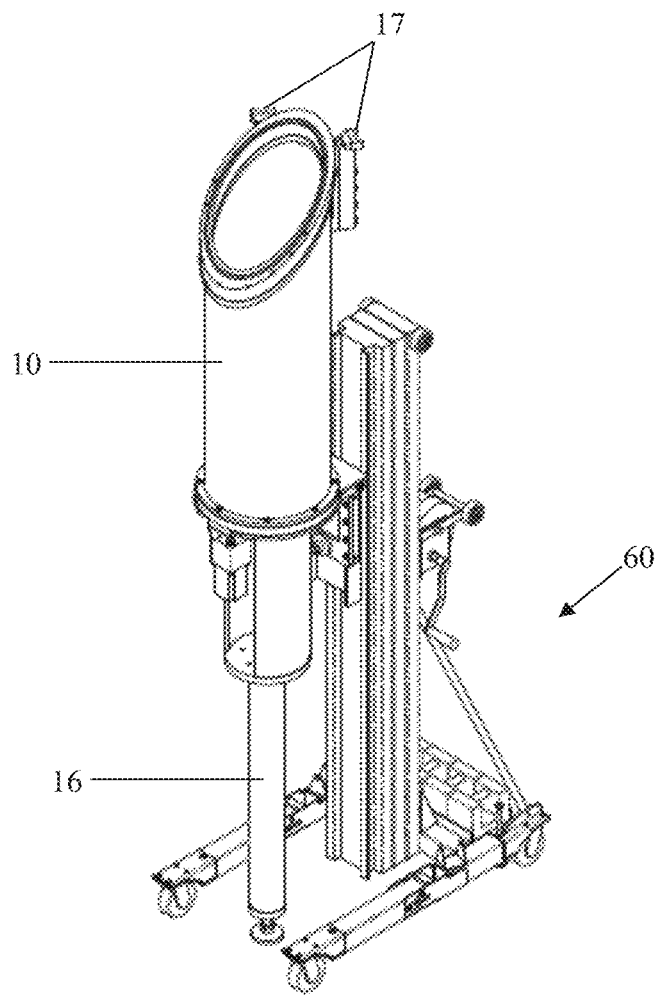
FIG. 6 shows the seal assembly of FIG. 3 in place on a robotic delivery system.

In use, the reactor pressure vessel head 3 is removed from the reactor and placed in a storage position within the containment building. (This is a routine step that is performed during refueling outages to allow access to the fuel rods and reactor core.) The nozzle 40 is coupled to the tooling 50, which is positioned within the seal assembly 10. The coupled assembly is then moved into position under the reactor pressure vessel head 3 using a robotic delivery system 60 such as shown in FIG. 6, and positioned about a CRDH nozzle 1 and thermal sleeve 2 to be serviced such that the rim 14 and gasket 15 contact the inner surface 3A of the head 3. The body 11 thus surrounds the CRDH nozzle 1 and thermal sleeve 2, forming a sealed region about the CRDH nozzle 1 and thermal sleeve 2.

Preferably, a plurality of seal assemblies 10 are provided, each with a different rim 14 curvature to accommodate different portions of the reactor pressure vessel head inner surface 3A, as this surface is spherical and thus has different curvatures from a vertical perspective. The seal body 11 has a diameter of approximately 17 in. With a back pressure of 40 psi, this requires approximately 10,000 lbs of force. At the worst case periphery location on the reactor pressure vessel head inner surface 3A, the angle is approximately 47°. This results in forces of approximately 9000 lbs vertically and 9000 lbs horizontally being imposed on the seal assembly 10. The seal assembly 10 is braced, for example by using the kickstand 16 and arms 17. The kickstand 16 may be electric or hydraulic, and is extended such that its distal end contacts the floor or bottom surface of the area under the reactor pressure vessel head 3 being treated. The calculated vertical load, which is a function of the location on the reactor pressure vessel head inner surface 3A being treated, is applied to the kickstand 16. The arms 17 are configured to abut adjacent CRDH nozzles when in the use position, providing lateral support to the assembly.

Liquid, such as water, is then introduced into the sealed region, forming a flooded region. This may be accomplished in a known manner, such as by connecting a source of water to the seal body 11 through a valve and opening the valve. The sealed region is then pressurized to a predetermined pressure level, such as approximately 30 psi to 50 psi. This may be accomplished by continuing to supply water to the flooded region, raising the liquid level until the weight thereof results in the desired pressure level. This may entail raising the liquid level well into the annulus 5 formed between the CRDH nozzle 1 and the thermal sleeve 2. A positive pressurizing means, such as a pump, may be used in conjunction with or as an alternative to raising the liquid level.

The tooling 50 is then engaged to position the nozzle 40 at its operational position relative the surface to be treated. With the nozzle 40 positioned, flow of the pressurized peening fluid is initiated causing the peening process to begin. The pressurized flow through the nozzle 40 causes cavitation bubbles to form. The flow is directed substantially parallel to the surface(s) to be treated with a standoff distance (that is, the distance between the nozzle discharge orifice and area of the surface to be treated) of approximately 5 in. to 7 in. The collapsing impact of the cavitation bubbles imparts compressive stress in the materials of the treatment surfaces. The tooling 50 is used to maneuver the nozzle 40 circumferentially around and vertically up and down in coordinated motion about the CRDH nozzle 1 and J-groove weld 4 to treat all desired surfaces thereof. Thus, the tube 1, reactor pressure vessel 3, and J-groove weld 4 can be treated without having to submerge the entire reactor pressure vessel head 3 underwater.

Operational parameters such as peening nozzle water pressure, flow rate, back pressure, peening nozzle position, and peening nozzle velocity can be qualified by performing cavitation peening of a mock-up example assembly, and then destructively inspecting the mock-up parts to measure the compressive residual stresses imparted thereto. These parameters are measured and recorded during use, and these recordings provided to the customer, thereby ensuring that the intended surfaces were actually treated as intended.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A cavitation peening apparatus for being positioned on a floor under a metal part for cavitation peening a region of the metal part, comprising:

a sealing device including a container that defines an interior volume configured to envelope the region, said volume configured to be filled with a first fluid at a predetermined pressure, the predetermined pressure generating a vertical force on the sealing device, said container having a closed end and an open end with a seal in a rim portion of said open end;

a nozzle positioned within said container for cavitation peening the region, wherein said container is configured to matingly engage and be sealed by the metal part; and a vertically actuatable support coupled to the container and configured to react against vertical sealing loads of the sealing device, said support being vertically actuatable away from the container and extendable into direct contact with the floor under the metal part to provide vertical support to said container to react against the vertical force on the sealing device during the cavitation peening of the region.

2. The apparatus of claim 1, wherein said rim has a closed contour to matingly engage a spherical surface of the region.

3. The apparatus of claim 1, wherein the support is coupled to said closed end.

4. The apparatus of claim 1, further comprising one or more arms coupled to said container and configured to extend from the container to laterally abut a portion of the metal part to provide lateral support to said container.

5. The apparatus of claim 1, further comprising a delivery system configured for moving the container along the floor into position under the metal part, the support configured to contact the floor under the metal part separately from the delivery system.

6. The apparatus as recited in claim 1 wherein the apparatus is configured such that the cavitation peening by the nozzle is designed to generate a back pressure in the container of 30 psi to 50 psi, the support being vertically actuated to provide a force to counter the back pressure.

7. The apparatus of claim 1, wherein the support is electric or hydraulic and applies a calculated vertical load to react the vertical force.

8. A method of peening a region of a treatment surface, comprising:

providing a cavitation peening apparatus on a floor or a support surface under the treatment surface, the cavitation peening apparatus including a sealing device including a container having a seal member configured to matingly engage the surface and a body defining an interior volume;

positioning said sealing device such that said seal member envelops the region and said seal member engages the surface to form a sealed region;

introducing a liquid into said sealed region to form a flooded region;

pressurizing said flooded region to a predetermined pressure level so as to generate a vertical force on the sealing device;

providing a nozzle of the cavitation peening apparatus within said flooded region; and injecting pressurized fluid from said nozzle to generate cavitation bubbles such that a collapsing impact of said cavitation bubbles imparts compressive stress in the region, wherein:

the cavitation peening apparatus provided has a vertically actuatable support coupled to the container, said support having a distal end opposite said body;

said positioning includes vertically actuating said support distal end away from the container into direct contact with the floor or support surface under the treatment surface to react against the vertical force on the sealing device during the injecting of pressurized fluid from said nozzle.

9. The method of claim 8, wherein:

the support extends from a closed end of said body.

10. The method of claim 8, wherein:

the sealing device provided has one or more arms extending from said body near said seal member; and said positioning further includes positioning said sealing device such that said one or more arms provide lateral support to said sealing device.

11. The method of claim 8, wherein said positioning includes:

calculating the vertical force imposed by said pressurized flooded region; and extending said support distal end to create a reactive force of equal or greater magnitude and substantially opposite direction to said vertical force.

12. The method of claim 8, further comprising measuring and recording one or more operational parameters during said injecting.

13. The method of claim 8, wherein said positioning includes moving, via a delivery system contacting the floor or support surface, the container into position under the metal part, the support configured to contact the floor or support surface under the treatment surface to be peened separately from the delivery system.

14. The method of claim 8, wherein the providing of the cavitation peening apparatus on the floor or the support surface includes temporarily positioning the cavitation peening apparatus upon the floor or support surface during the injecting of pressurized fluid from said nozzle.

15. A method of peening the outer surface material of a treatment tube extending through a nuclear reactor pressure vessel, comprising:

providing a cavitation peening apparatus including a sealing device having a seal member configured to matingly engage a surface of the nuclear reactor pressure vessel and a body defining an interior volume;

positioning said sealing device such that said volume envelops the treatment tube extending beyond an inner surface of the reactor pressure vessel and said seal member engages the inner surface of the reactor pressure vessel to form a sealed region about the treatment tube;

introducing a liquid into said sealed region to form a flooded region;

pressurizing said flooded region to a predetermined pressure level;

introducing a nozzle of the cavitation peening apparatus into said flooded region; and injecting pressurized fluid from said nozzle to generate cavitation bubbles such that a collapsing impact of said cavitation bubbles imparts compressive stress in an outer surface material of the treatment tube, wherein:

the sealing device provided has one or more arms extending from said body near said seal member; and said positioning further includes positioning said sealing device such that said one or more arms contact outer circumferences of one or more additional tubes extending through the nuclear reactor pressure vessel.

16. The method of claim 15, wherein:

the sealing device has a kickstand extending from a closed end of said body, said kickstand having a distal end opposite said body; and said positioning includes extending said kickstand distal end such that it contacts a floor under the nuclear reactor pressure vessel to provide vertical support to said sealing device.

17. The method of claim 16, wherein said positioning includes:

calculating a vertical force component imposed by said pressurized flooded region; and extending said kickstand distal end to create a reactive force of equal or greater magnitude and substantially opposite direction to said vertical force component.

18. The method of claim 15, wherein the treatment tube is coupled to the nuclear reactor pressure vessel by welds, and said injecting includes generating cavitation bubbles such that the collapsing impact of said cavitation bubbles imparts compressive stress in the welds.

19. The method of claim 15, further comprising measuring and recording one or more operational parameters during said injecting.

20. The method of claim 15, wherein said positioning includes moving, via a delivery system contacting a floor or support surface supporting the cavitation apparatus, the container into position under the tube, the support configured to contact the floor or support surface under the treatment tube separately from the delivery system.

* * * * *